United States Patent [19]

Demou et al.

[11] 3,887,505

[45] June 3, 1975

[54] PREPARATION OF LOW DENSITY FLEXIBLE URETHANE FOAMS WITH ENHANCED LOAD-BEARING PROPERTIES

[75] Inventors: John G. Demou, Lincoln Park; Moses Cenker, Trenton, both of Mich.

[73] Assignee: BASF Wyandotte Corporation, Wyandotte, Mich.

[22] Filed: Dec. 3, 1973

[21] Appl. No.: 421,088

[52] U.S. Cl.... 260/2.5 AB; 260/2.5 AP; 260/2.5 AS
[51] Int. Cl... C08g 22/40; C08g 22/46; C08g 22/14
[58] Field of Search... 260/2.5 AB, 2.5 AC, 2.5 AQ, 260/2.5 AP, 2.5 AS

[56] References Cited
UNITED STATES PATENTS
3,332,934   7/1967   Booth............................ 260/2.5 AQ
3,398,106   8/1968   Hostettler..................... 260/2.5 AB
3,595,814   7/1971   Lloyd............................ 260/2.5 AQ

*Primary Examiner*—Melvyn I. Marquis
*Assistant Examiner*—C. Warren Ivy
*Attorney, Agent, or Firm*—Norbert M. Lisicki; Bernhard R. Swick; Robert E. Dunn

[57]   ABSTRACT

A method of improving the load-bearing properties of low density flexible urethane foams which comprises carrying out the foaming reaction in the presence of an organic stannous compound as the sole catalyst for the reaction.

7 Claims, No Drawings

PREPARATION OF LOW DENSITY FLEXIBLE URETHANE FOAMS WITH ENHANCED LOAD-BEARING PROPERTIES

BACKGROUND OF THE INVENTION

1. Field of the Invention

The present invention pertains to the preparation of low density flexible polyurethane foams with enhanced load-bearing properties. This is accomplished by carrying out the reaction between a polyoxyalkylene ether polyol containing at least 17% primary hydroxyl groups and an organic polyisocyanate to form flexible polyurethane foams employing stannous compounds as the sole catalyst.

2. Prior Art

Flexible polyurethane foams may be prepared by a number of methods. By far the most popular and most economical is the "one-shot" method. In this method the foam is prepared by mixing the reactants together simultaneously through the use of a multiple mixing head of a foam machine. The essential ingredients are polyol, polyisocyanate, silicone surfactant, blowing agent, amine catalyst and an organo-tin catalyst. When water is used as the blowing agent, the prior art teaches that amine catalysts are necessary to catalyze the isocyanate-water reaction, which reaction creates the gas necessary for expanding the foam. Tin catalysts are reported to have too low a catalytic effect on the isocyanate-water reaction to produce satisfactory foam if used as the sole catalyst. (See Bender "Handbook of Foamed Plastics," page 177. Also see the article by G. P. Mack, "Modern Plastics," December, 1964.)

SUMMARY OF THE INVENTION

The present invention is based on the discovery that satisfactory low density foams may be made using an organo-tin catalyst alone when water is present as the blowing agent. It was further unexpectedly discovered that low density foams (1–2 lbs./cu. ft.) having increased load-bearing properties could be prepared in the absence of an amine catalyst. It was further discovered that polyurethane foams possessing improved load-bearing properties could be prepared by the use of polyoxyalkalene ether polyols containing at least 17% primary hydroxyl groups with the best load-bearing properties obtained with polyols containing 100% primary hydroxyl groups. Flexible urethane foams with increased load-bearing properties are highly desirable for use as cushioning in both the automotive and furniture industries.

A more detailed and comprehensive discussion of the present invention is found in the following description and examples thereof.

DESCRIPTION OF THE PREFERRED EMBODIMENT

In accordance with the present invention, polyurethane foams are prepared by reacting, a. a polyoxyalkylene ether polyol containing at least 17% primary hydroxyl groups,
b. an organic polyisocyanate,
c. water,
d. a catalytic amount of an organic stannous compound, and
e. a polysiloxane oxyalkylene surfactant.

This reaction takes place in the absence of an amine catalyst.

Generally speaking, the polyols of the present invention are those which are characterized as being essentially hydroxyl-terminated polyether polyols and they include the polyoxyalkylene ether glycols which have the general formula $H(OR)_nOH$ where R is an alkylene radical and n is an integer which in a preferred embodiment is sufficiently large that the compound as a whole has an equivalent weight range from about 100 to about 3,000. The polyols include those prepared by condensing monomeric units such as ethylene oxide, propylene oxide, butylene oxide and mixtures thereof with active hydrogen compounds such as 1,2-propylene glycol, 1,3-propylene glycol, 1,2-butanediol, 1,4-butanediol, 1,3-butanediol, hexanetriol, glycerol, trimethylolpropane, hydroquinone, pentaerythritol, alphamethyl glucoside, sorbitol and sucrose; acids such as adipic acid, succinic acid, aconitic acid, trimellitic acid and phosphoric acids; amines such methyl amine, ethyl amine, ethylene diamine, diethylene triamine, toluene diamine, aniline, methylene diamine, piperazine, and triisopropanol amine; phenolic compounds such as bisphenol, pyrogallol, resorcinol, inositol; mercaptans such as 1,2-ethanedithiol, and 1,2,3-propanetrithiol, and acid amides such as acetamide and benzyl sulfonamide.

Typical polyols include polyoxypropylene glycol, polyoxybutylene glycol, polytetramethylene glycol block copolymers, e.g., combinations of polyoxypropylene and polyoxyethylene glycols, more specifically those having the general formula:

$$HO(C_2H_4O)_n(C_3H_6O)_m(C_2H_4O)_nH$$

wherein $n$ and $m$ are together sufficient for attainment of the desired equivalent weight range, that is, from about 100 to about 3,000. Also included are copolymers of poly-1,2oxybutylene and polyoxyethylene glycols; and poly-1,4-oxybutylene and polyoxyethylene glycols, and random copolymer glycols prepared from blends, or sequential addition, of two or more alkylene oxides as well as glycols, as described above, capped with ethylene oxide units. The polyols of this invention can contain arylene or cycloalkylene radicals together with the alkylene radicals as, for example, in the condensation product of a polyoxyalkylene ether glycol with a,a'-dibromo-p-xylene in the present of a catalyst. In such products, the cyclic groups inserted in the polyether chain are preferably phenylene, naphthalene or cyclohexylene radicals or those radicals containing alkyl or alkylene substituents, as in the tolylene, phenylethylene or xylylene radicals.

To produce polyols of varying primary hydroxyl content, ethylene oxide can be added as a final step in the oxyalkylation process. The primary hydroxyl content resulting from this addition will depend upon the molecular weight of the oxyalkylated product, and the amount of ethylene oxide added. Thus, it is possible that a polyol of high molecular weight, i.e., about 6,000 can be capped with 15 percent ethylene oxide and result in a primary hydroxyl content of about 100 percent. A polyol with a molecular weight of about 3,000 and capped with 11 percent ethylene oxide would contain about 50 percent primary hydroxyl content. Polyols of a desired primary hydroxyl content can also be prepared by blends of polyols containing various primary hydroxyl contents.

As is well known to those skilled in the art, hydroxyl groups are classified as primary, secondary, or tertiary depending upon how many hydrogen atoms are attached to the carbon atom which has attached to it the hydroxyl group. Thus, if two or more hydrogen atoms are attached to the carbon atom which is joined to the hydroxyl group, the hydroxyl group is primary; if one hydrogen is attached to the carbon atom, the hydroxyl group is secondary, and if no hydrogen is attached to the carbon atom, the hydroxyl group is tertiary.

The primary hydroxyl contents were determined by using a nuclear magnetic resonance (NMR) procedure. This method involves the complete acetylation of the polyol with acetic anhydride and measurement of the NMR spectrum of this polyol acetate derivative. Integration of NMR signals arising from resonance of methylene and methine protons adjacent to acetate groups gives a ratio from which the primary hydroxyl concentrations were calculated.

The polyisocyanates of the invention include, for example, polymethylene diisocyanates such as tetramethylene diisocyanate and hexamethylene diisocyanate and aromatic diisocyanates such as 80/20 2,4- 2,6-toluene diisocyanate, 65/35 2,4- 2,6-toluene diisocyanate, 4,4'-diphenylmethane diisocyanate, xylylene diisocyanate and 1,5-naphthalene diisocyanate. The polyisocyanate may be used in an amount which provides an NCO/OH ratio from about 0.9:1 to 1.5:1, preferably an NCO/OH ratio from about 1.00:1 to 1.2:1. The NCO/OH ratio is defined as the ratio of total NCO equivalent to total active hydrogen equivalent (i.e., hydroxyl plus water).

The organic stannous salt catalysts which may be employed are polyvalent salts of organic acids having up to about 18 carbon atoms. The organic portion of the salt may be linear, cyclic, saturated, or unsaturated. Among the metallic salts which may be employed are stannous acetate, stannous butyrate, stannous laurate, stannous octoate, stannous oleate, stannous stearate, and stannous lineoleate. The organic stannous salt catalyst is used in an amount by weight corresponding to 0.01 to 1.5 percent based upon the weight of the polyether polyol and preferably in an amount corresponding to about 0.025 percent to 1.3 percent of the weight of polyether polyol.

In addition to the previously defined ingredients useful in the preparation of the foam, other ingredients, such as surfactants, fillers, pigments and the like can also be included. Surfactants which can be used are the conventional surfactants used in urethane preparation such as the polysiloxanes, oxyalkylated polysiloxanes or the alkylene oxide adducts of organic compounds containing reactive hydrogen atoms.

Generally, the surfactant is employed in an amount ranging from about 0.01 part to 5 parts by weight thereof per hundred parts of polyol. Conventional fillers for use herein include, for example, aluminum silicate, calcium silicate, magnesium silicate, calcium carbonate, barium sulfate, calcium sulfate, carbon black and silica. The filler is nominally present in an amount ranging from about 5 parts to 50 parts by weight thereof per hundred parts by weight of polyol and, preferably, from about 15 parts to 45 parts by weight thereof per one hundred parts of polyol.

The pigment which can be used herein can be selected from any conventional pigment heretofore disclosed in the art, such as, titanium dioxide, zinc oxide, iron oxides, antimony oxide, chrome green, chrome yellow, iron blue siennas, molybdate oranges, organic pigments, such as para reds, benzidine yellow, toluidine red, toners, and phthalocyanines.

Among the desirable properties of flexible polyurethane foam are its load-bearing properties. Generally, the term "load-bearing" relates to the resistance of the foam to deflection when a load is brought to bear upon it. There are three ASTM procedures designated as D-1564-71 which are used in measuring the load-bearing properties.

Method A, Indentation Load Deflection Test (ILD), consists of measuring the load necessary to produce 25 percent and 65 percent indentations in the foam product. The test specimen cannot be less than 15 inches × 15 inches × 0.75 inch.

Method B, Indentation Residual Gage Load Test (IRGL), consists of measuring the thickness of the foam specimen under specific load conditions.

Method C, Compression Load Deflection Test (CLD), consists of measuring the load necessary to produce a 25 percent and a 50 percent compression over the entire top area of the foam. This method employs a compression foot which is larger than the specimen to be tested. Method C can be advantageously used in comparing hand-mixed foams.

In general, the quantities of materials used to produce hand-mixed foams are insufficient to produce a test specimen of the size required by the other test methods. The usual size specimens may be as small as 4 square inches in area and a minimum thickness of 0.75 inch. Thus, only CLD data for the hand-mixed foams are included.

Generally, as the density of the foam increases, the load-bearing ability increases. Accordingly, for a proper evaluation of the improved load-bearing properties, the values of the compression load deflection test are normalized to a foam density of 1.0.

Foam Preparation

The hand-mixed foams were prepared by charging the polyol, distilled water, and silicone surfactant to a onequart capacity cylindrical container and stirring the mixture with a Lightnin' Model V-7 mixer fitted with a 1¼ inch diameter shrouded mixing blade. The stirring was controlled with a Powerstat and timed with a stopwatch.

The Powerstat was set at 140 volts, the stopwatch and stirrer were started simultaneously and the mixture was initially stirred for fifteen seconds. After thirty seconds, stirring was restarted and the catalyst was added. After a total elapsed time of sixty seconds, toluene diisocyanate was added, stirred for an additional five seconds and the mixture was then poured into a 10 inch × 10 inch × 4 inch cardboard cake box. After the foam had formed, it was cured in an oven at 250° F. for one-half hour. The physical properties of the foam were determined after aging for at least seven days.

The following examples are provided to further illustrate the invention. In these examples, the polyols employed have the following compositions:

Polyol A is a glycerol-propylene oxide adduct having an equivalent weight of about 1,000 and containing about 5 percent hydroxyl groups.

Polyol B is a glycerol-propylene oxide-ethylene oxide adduct having an equivalent weight of about 1,000, containing about 10 percent ethylene oxide and a primary hydroxyl content of about 50 percent.

Polyol C is a glycerol-propylene oxide-ethylene oxide adduct having an equivalent weight of about 1,000, containing about 18 percent ethylene oxide and a primary hydroxyl content of about 100 percent.

Polyol D is a trimethylolpropane-propylene oxide-ethylene oxide adduct having an equivalent weight of about 2200, containing about 15 percent ethylene oxide and a primary hydroxyl content of about 100 percent.

Polyol E is a propylene oxide-ethylene oxide adduct of propylene glycol having an equivalent weight of about 1,000 and containing about 13 percent ethylene oxide and a primary hydroxyl content of about 75 percent.

Polyol F is a propylene oxide adduct of pentaerythritol having an equivalent weight of about 125 and containing a primary hydroxyl content of about 5 percent.

All concentrations in the following examples are parts by weight unless otherwise specified.

The following examples demonstrate the formulations used and physical properties of flexible foams obtained using the above-described procedure.

EXAMPLE I

| Ingredients | Foam No. 1 | Foam No. 2 |
|---|---|---|
| Polyol B | 100 | 100 |
| Water | 4 | 4 |
| Triethylenediamine | — | 0.17 |
| Oxyalkylated Polysiloxane | 0.33 | 0.5 |
| Stannous Octoate | 0.13 | 0.11 |
| Toluene Diisocyanate (80/20) | 50.2 | 50.2 |
| Primary Hydroxyl, % | 50 | 50 |
| Properties | | |
| Density (core), pcf | 1.57 | 1.55 |
| Tensile Strength, psi | 13.7 | 14.3 |
| Tear Resistance, pi | 1.8 | 1.6 |
| Compression Load, psi | | |
| 25% Deflection | 0.64 | 0.52 |
| 25% Deflection, Normalized | 0.41 | 0.34 |
| 50% Deflection | 0.71 | 0.60 |
| 50% Deflection, Normalized | 0.45 | 0.39 |
| Compression Set, % | | |
| 50% Deflection | 5.1 | 4.4 |
| 90% Deflection | 6.1 | 4.6 |

Example I illustrates the improved load-bearing properties obtained while no deterioration of the other properties occur when a stannous salt is the sole catalyst.

EXAMPLE II

| Ingredients | Foam No. 3 | Foam No. 4 |
|---|---|---|
| Polyol B | 95 | 95 |
| Polyol D | 5 | 5 |
| Water | 5 | 5 |
| Triethylenediamine | 0.30 | — |
| Oxyalkylated Polysiloxane | 1.0 | 1.0 |
| Stannous Octoate | 0.25 | 0.25 |
| Toluene Diisocyanate (65/35) | 63.6 | 63.6 |
| Primary Hydroxyl, % | 16 | 16 |
| Properties | | |
| Density (core), pcf | 1.26 | 1.29 |
| Tensile Strength, psi | 16.4 | 16.3 |
| Tear Resistance, pi | 1.9 | 1.8 |
| Compression Load, psi | | |
| 25% Deflection | 0.70 | 0.86 |
| 25% Deflection, Normalized | 0.56 | 0.67 |
| 50% Deflection | 0.76 | 0.93 |
| 50% Deflection, Normalized | 0.60 | 0.72 |
| Compression Set, % | | |
| 50% Deflection | 8.6 | 6.6 |
| 90% Deflection | 11.6 | 11.5 |

Example II illustrates the improvement in the load-bearing properties employing a 65/35 2,4-2,6-toluene diisocyanate ratio when a stannous salt is the sole catalyst.

EXAMPLE III

| Ingredients | Foam No. 5 | 6 | 7 | 8 | 9 |
|---|---|---|---|---|---|
| Polyol A | 100 | 73 | — | 18 | — |
| Polyol B | — | 27 | 100 | — | — |
| Polyol C | — | — | — | 82 | — |
| Polyol D | — | — | — | — | 100 |
| Water | 4.0 | 4.0 | 4.0 | 4.0 | 4.0 |
| Oxyalkylated Polysiloxane | 0.33 | 0.33 | 0.33 | 0.33 | 0.33 |
| Stannous Octoate | 0.17 | 0.17 | 0.13 | 0.15 | 0.21 |
| Toluene Diisocyanate (80/20) | 50.0 | 50.0 | 50.2 | 49.7 | 44.7 |
| Primary Hydroxyl, % | 5 | 17 | 50 | 83 | 100 |
| Properties | | | | | |
| Density (core), pcf | 1.53 | 1.55 | 1.57 | 1.55 | 1.72 |
| Tensile Strength, psi | 14.9 | 14.1 | 13.2 | 12.8 | 16.5 |
| Tear Resistance, pi | 1.7 | 1.9 | 1.8 | 2.7 | 3.7 |
| Compression Load, psi | | | | | |
| 25% Deflection | 0.57 | 0.63 | 0.64 | 0.74 | 0.79 |
| 25% Deflection, Normalized | 0.36 | 0.41 | 0.41 | 0.48 | 0.46 |
| 65% Deflection | 0.83 | 1.05 | 0.99 | 1.22 | 1.21 |
| 65% Deflection, Normalized | 0.54 | 0.68 | 0.63 | 0.79 | 0.70 |
| Compression Set, % | | | | | |
| 50% Deflection | 5.4 | 5.2 | 4.4 | 4.2 | 5.8 |
| 90% Deflection | 6.8 | 6.5 | 6.2 | 5.2 | 12.9 |

Example III illustrates the continuing improvement of the load-bearing properties of polyurethane foam products as the primary hydroxyl content increases.

EXAMPLE IV

| Ingredients | Foam No. | | | |
|---|---|---|---|---|
| | 10 | 11 | 12 | 13 |
| Polyol A | 73 | — | 18 | — |
| Polyol B | 27 | 100 | — | — |
| Polyol C | — | — | 82 | — |
| Polyol D | — | — | — | 100 |
| Water | 4.0 | 4.0 | 4.0 | 4.0 |
| Oxyalkylated Polysiloxane | 1.0 | 0.50 | 0.67 | 0.33 |
| Stannous Octoate | 0.63 | 0.38 | 0.50 | 1.01 |
| Toluene Diisocyanate (65/35) | 50.0 | 50.2 | 49.7 | 44.7 |
| Primary Hydroxyl, % | 17 | 50 | 83 | 100 |
| Properties | | | | |
| Density (core), pcf | 1.52 | 1.51 | 1.54 | 1.64 |
| Tensile Strength, psi | 16.0 | 16.3 | 13.4 | 19.5 |
| Tear Resistance, pi | 2.6 | 2.0 | 1.9 | 4.4 |
| Compression Load, psi | | | | |
| 25% Deflection | 0.70 | 0.71 | 0.80 | 1.18 |
| 25% Deflection, Normalized | 0.46 | 0.47 | 0.52 | 0.72 |
| 65% Deflection | 1.02 | 1.03 | 1.20 | 1.45 |
| 65% Deflection, Normalized | 0.67 | 0.68 | 0.78 | 0.88 |
| Compression Set, % | | | | |
| 50% Deflection | 3.7 | 3.1 | 2.4 | 5.1 |
| 90% Deflection | 4.9 | 4.0 | 3.0 | 9.5 |

Example IV further illustrates the improved load-bearing properties obtained with increasing primary hydroxyl content when a 65/35 2,4-2,6-toluene diisocyanate is employed with a stannous salt as the sole catalyst.

EXAMPLE V

| Ingredients | Foam No. | |
|---|---|---|
| | 14 | 15 |
| Polyol B | 95 | 95 |
| Polyol D | 5 | 5 |
| Water | 4.3 | 4.3 |
| Oxyalkylated Polysiloxane | 1.2 | 1.2 |
| Diisodecylphthalate | 1.4 | 0.9 |
| Stannous Oleate | 0.7 | — |
| Stannous Octoate | — | 0.3 |
| Toluene Diisocyanate (65/35) | 56.6 | 56.6 |
| Primary Hydroxyl, % | 17 | 17 |
| Properties | | |
| Density (core), pcf | 1.28 | 1.28 |
| Tensile Strength, psi | 17.7 | 22.9 |
| Tear Resistance, pi | 2.3 | 2.3 |
| Compression Load, psi | | |
| 25% Deflection | 0.59 | 0.57 |
| 25% Deflection, Normalized | 0.46 | 0.45 |
| 50% Deflection | 0.63 | 0.63 |
| 50% Deflection, Normalized | 0.49 | 0.49 |
| Compression Set, % | | |
| 50% Deflection | 6.4 | 10.5 |
| 90% Deflection | 7.5 | 10.6 |

What is claimed is:

1. In the preparation of low-density flexible polyurethane foams having improved load-bearing properties by a process which comprises reacting:
   a. a polyoxyalkylene ether polyol or polyol blend which was prepared by condensing monomeric units such as ethylene oxide, propylene oxide, butylene oxide and mixtures thereof with active hydrogen compounds selected from the group consisting of 1,2-propylene glycol, 1,3-propylene glycol, 1,2-butanediol, 1,4-butanediol, 1,3-butanediol, hexanetriol, glycerol, trimethylolpropane, hydroquinone, pentaerythritol, alpha-methyl glucoside, sorbitol, and sucrose, having an equivalent weight of at least 100 and a primary hydroxyl content of at least 17 percent,
   b. an organic polyisocyanate,
   c. water, and 1 – polyoxyalkylene
   d. a surfactant,
   the improvement comprising catalyzing the reaction in the presence of an organic stannous compound selected from the group consisting of stannous acetate, stannous butyrate, stannous laurate, stannous octoate, stannous stearate, stannous oleate and stannous linoleate, as the sole catalyst.

2. The process of claim 1 wherein the polyoxyalkylene ether polyol or polyol blend has an equivalent weight range of 100 to 3,000.

3. The process of claim 1 wherein the ratio of organic polyisocyanate to polyoxyalkylene ether polyol is from about 0.9:1 to 1.5:1.

4. The process of claim 1 wherein the concentration of organic stannous compound is from about 0.01 percent to 1.5 percent based on the total weight of the polyoxyalkylene ether polyol.

5. The process of claim 1 wherein the primary hydroxyl content of the polyoxyalkylene ether polyol is from about 17 percent to 100 percent.

6. The process of claim 1 wherein the organic polyisocyanate is selected from the group consisting of 80/20 2,4-2,6-toluene diisocyanate and 65/35 2,4- 2,6-toluene diisocyanate.

7. The process of claim 1 wherein the surfactant is an oxyalkylated polysiloxane.

* * * * *

UNITED STATES PATENT OFFICE
CERTIFICATE OF CORRECTION

PATENT NO. : 3,887,505
DATED : June 3, 1975
INVENTOR(S) : John G. Demou and Moses Cenker It is certified that error appears in the above-identified patent and that said Letters Patent are hereby corrected as shown below:

Claim 1, line 35 should read

"c. water, and"

Signed and Sealed this sixteenth Day of September 1975

[SEAL]

Attest:

RUTH C. MASON
Attesting Officer

C. MARSHALL DANN
Commissioner of Patents and Trademarks